C. E. WRIGHT.
POWER TRANSMISSION MECHANISM.
APPLICATION FILED JAN. 24, 1913.

1,194,113.

Patented Aug. 8, 1916.

WITNESSES:

INVENTOR
CLARENCE E. WRIGHT.
BY
ATTORNEY

UNITED STATES PATENT OFFICE.

CLARENCE E. WRIGHT, OF LOUISVILLE, KENTUCKY, ASSIGNOR OF ONE-HALF TO ERNEST S. CARPENTER, OF FRANKLIN, INDIANA.

POWER-TRANSMISSION MECHANISM.

1,194,113.      Specification of Letters Patent.      Patented Aug. 8, 1916.

Application filed January 24, 1913. Serial No. 743,885.

*To all whom it may concern:*

Be it known that I, CLARENCE E. WRIGHT, a citizen of the United States, and a resident of Louisville, county of Jefferson, and State of Kentucky, have invented a certain new and useful Power-Transmission Mechanism; and I do hereby declare that the following is a full, clear, and exact description thereof, reference being had to the accompanying drawings, in which like letters refer to like parts.

The object of this invention is to improve the construction of moving picture machines whereby the working parts are reduced and simplified and a more positive and quick action can be obtained. Also, the parts are rigidly connected together so that there will be no vibration or lost motion or lack of positiveness in action, and there will be little friction.

The chief feature of the invention consists in the means for actuating the star wheel which moves the film. For this purpose the star wheel is given a one-fourth rotation, and herein the star wheel is given its actuation by a transversely inclined cam groove in the periphery of a cam wheel, the surface of the periphery of the cam wheel holding the star wheel in exact position between periods of actuation thereof.

Another feature of the invention consists in mounting the cam wheel and shutter on the same shaft, and this rigid mounting, associated with the close fitting of the cam wheel with the star wheel so that the latter can have no independent play, causes the machine to operate with great accuracy and accomplishes the objects above specified.

The full nature of the invention will be understood from the accompanying drawings and the following description and claims.

Figure 1:
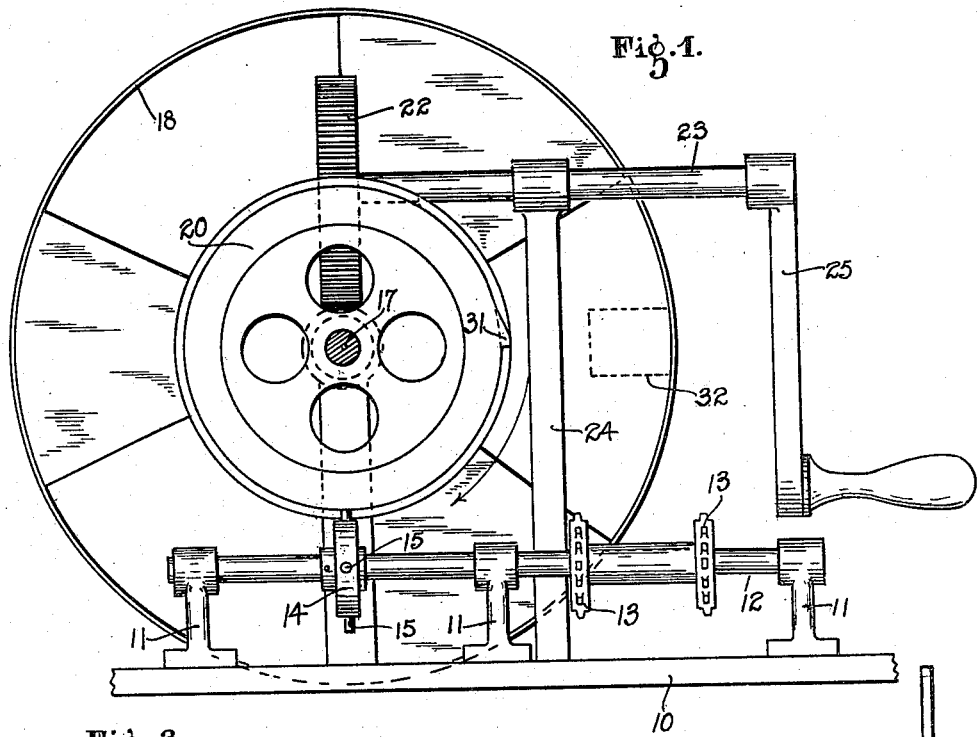
Figures 2, 3:
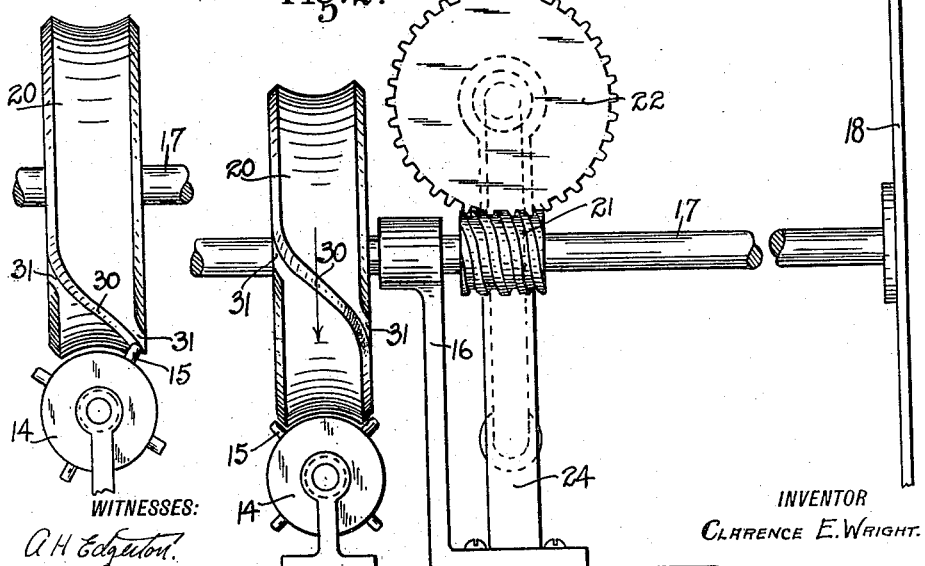

In the drawings, Figure 1 is a front elevation of the portion of a moving picture machine which is used in operating the shutter. Fig. 2 is a side elevation thereof with parts omitted and parts broken away. Fig. 3 is an elevation of a part of Fig. 2 in altered position.

In detail, the mechanism, as shown in the drawings hereof, includes a base plate 10 having bearings 11 thereon, in which a shaft 12 is mounted, which carries the sprocket wheels 13 for the film. On said shaft there is a star wheel 14 mounted consisting of a disk with four equidistant pins 15 projecting radially from the periphery thereof.

On the base plate 10 there is a bearing support 16 in which the shutter shaft 17 is mounted. The shutter 18 is secured on one end of said shaft, and on said shaft a cam wheel 20 is secured. The shaft 17 is driven by the worm 21 on said shaft and the worm gear 22 on the shaft 23 mounted in bearings 24 extending from the base plate 10. Said shaft 23 is actuated by a crank or handle 25.

The invention is not limited to the details of construction or mounting of the parts 21, 22, 23, 24 and 25, as any simple means may be employed for driving the shutter shaft 17. The central and main portion of the periphery of the cam wheel is concave so as to conform to and be parallel with the peripheral surface of the star wheel 14, said latter wheel being located transversely of the cam wheel, and the transverse curvature of the central concave peripheral surface of the cam wheel being concentric with the center of the star wheel. On each side of the concave central surface of the periphery of the cam wheel 20 there is a beveled surface, the bevel transversely of the cam wheel being substantially parallel with the pins 15 of the star wheel, and the width of the cam wheel being substantially equal to the distance between two pins on the star wheel. The object of this feature of the construction of the cam wheel is that it will fit close to the star wheel and between a pair of pins thereof, so that the star wheel can have no rotary movement or play, excepting when actuated by the cam wheel.

For actuating the star wheel there is an inclined or spirally extending groove 30 in the periphery of the cam wheel, passing from one lateral edge to the other lateral edge thereof, as shown in Fig. 2. At the right-hand side of the cam wheel there is a shoulder 31 projecting across the bevel and out into radial alinement with the lateral edge of the cam wheel. A similar shoulder 31 lies also on the other side of the cam wheel, see Figs. 1 and 2. Since the pin 15 lies and bears against the bevel on the side edge of the cam wheel, when said cam wheel rotates the shoulder 31 will come into engagement with the pin and deflect it into the groove 30, and as the cam wheel further rotates it causes the pin of the star wheel to continue to travel through the groove 30 until it reaches the other side of the cam wheel, and that will cause a one-fourth rotation of the star wheel. No greater movement of the star wheel will result thereby because it will be stopped by the next succeeding pin coming in contact with the beveled lateral edge of the cam wheel. Therefore, as the cam wheel is rotated, at each revolution it will cause a one-fourth rotation of the star wheel and a movement of the film to that extent. That actuation and movement is a positive one and when each movement is completed, as has been stated, the star wheel can have no play or further movement until it is again actuated by the cam wheel in the manner explained. With a shoulder 31 on each side of the cam wheel, it is obvious that the machine can be operated in either direction. Furthermore, the number of the cam grooves 30 may be such as desired, one or more.

32 is a dotted line indicating the location of the exposure opening in the frame, which latter, however, is not shown.

I claim as my invention:

1. The combination of a star wheel with radially projecting pins, a cam wheel adjacent thereto and mounted at a right angle to the star wheel and provided with a cam groove across its periphery, and a shoulder on the edge of the cam wheel in position to engage the outer side of a pin of the star wheel and deflect it into the cam groove, whereby one of said wheels will cause a partial rotation of the other wheel.

2. The combination of a star wheel with radially projecting pins, a cam wheel adjacent thereto and mounted at a right angle to the star wheel and with its periphery curved transversely concentric with the star wheel and lying between a pair of pins from the star wheel and with its lateral edges beveled and in engagement with said pins, and a shoulder on each lateral edge of the cam wheel projecting laterally and in position to engage the outer side of a pin of the star wheel and deflect it into said cam groove and whereby said device can be operated in either direction.

In witness whereof, I have hereunto affixed my signature in the presence of the witnesses herein named.

CLARENCE E. WRIGHT.

Witnesses:
J. H. WELLS,
O. M. McLAUGHLIN.

Copies of this patent may be obtained for five cents each, by addressing the "Commissioner of Patents, Washington, D. C."